(12) United States Patent
Hiroshima et al.

(10) Patent No.: US 8,777,091 B2
(45) Date of Patent: Jul. 15, 2014

(54) LIGHT EMITTING MEMBER MOUNTING METHOD AND APPARATUS

(71) Applicant: Fujitsu Limited, Kawasaki (JP)

(72) Inventors: Yoshiyuki Hiroshima, Nakano (JP); Naoki Nakamura, Hachioji (JP); Akiko Matsui, Meguro (JP); Tetsuro Yamada, Kawasaki (JP); Takahiro Ooi, Kawasaki (JP); Kohei Choraku, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/765,393

(22) Filed: Feb. 12, 2013

(65) Prior Publication Data

US 2013/0256387 A1    Oct. 3, 2013

(30) Foreign Application Priority Data

Mar. 27, 2012  (JP) .................. 2012-071794

(51) Int. Cl.
    *B23K 31/02*       (2006.01)
(52) U.S. Cl.
    USPC ..................... 228/180.21; 228/215
(58) Field of Classification Search
    None
    See application file for complete search history.

(56) References Cited

U.S. PATENT DOCUMENTS

| | | | | |
|---|---|---|---|---|
| 5,478,778 | A * | 12/1995 | Tanisawa | 438/25 |
| 6,608,283 | B2 * | 8/2003 | Liu et al. | 219/121.85 |
| 6,965,552 | B2 * | 11/2005 | Tokuda et al. | 369/121 |
| 7,122,896 | B2 * | 10/2006 | Saito et al. | 257/738 |
| 7,510,176 | B2 | 3/2009 | Oda et al. | |
| 7,854,365 | B2 * | 12/2010 | Li et al. | 228/180.21 |
| 8,403,202 | B1 * | 3/2013 | Lai | 228/180.22 |
| 2003/0228084 | A1 * | 12/2003 | Kanda et al. | 385/14 |
| 2005/0135112 | A1 * | 6/2005 | Olkay et al. | 362/551 |
| 2006/0173242 | A1 * | 8/2006 | Navok et al. | 600/133 |
| 2008/0131050 | A1 * | 6/2008 | Yanagisawa | 385/14 |
| 2009/0134205 | A1 * | 5/2009 | Kimbara | 228/180.21 |
| 2009/0159902 | A1 * | 6/2009 | Yasuda et al. | 257/88 |
| 2009/0190878 | A1 * | 7/2009 | Yanagisawa | 385/14 |
| 2011/0127080 | A1 * | 6/2011 | Fjelstad | 174/262 |
| 2011/0240717 | A1 * | 10/2011 | Song et al. | 228/180.22 |
| 2012/0001551 | A1 | 1/2012 | Abe et al. | |
| 2012/0087620 | A1 * | 4/2012 | Pardo et al. | 385/14 |
| 2012/0118427 | A1 * | 5/2012 | Brookstein et al. | 139/35 |
| 2013/0039013 | A1 * | 2/2013 | Waegli et al. | 361/720 |
| 2013/0146646 | A1 * | 6/2013 | Suzuki et al. | 228/180.1 |
| 2013/0206230 | A1 * | 8/2013 | Sridharan et al. | 136/259 |

FOREIGN PATENT DOCUMENTS

| | | | |
|---|---|---|---|
| JP | 57-188848 A | * | 11/1982 |
| JP | 2005-285889 | | 10/2005 |
| JP | 2006-248728 | | 9/2006 |
| JP | 2010-220395 | | 9/2010 |

* cited by examiner

*Primary Examiner* — Kiley Stoner
(74) *Attorney, Agent, or Firm* — Fujitsu Patent Center

(57) ABSTRACT

A light emitting member mounting method includes: causing a friction material to contact a substrate including at least an optical waveguide member mounted on a base and to contact a light emitting member that is to be mounted to the substrate and that is equipped with a light emitting component, so as to suppress relative movement between the substrate and the light emitting member using frictional force exerted on the substrate and the light emitting member, and positionally aligning the light emitting member to the substrate by employing light emitted from the light emitting component; and bonding the substrate and the light emitting member together by melting a bonding material interposed between the substrate and the light emitting member.

3 Claims, 5 Drawing Sheets

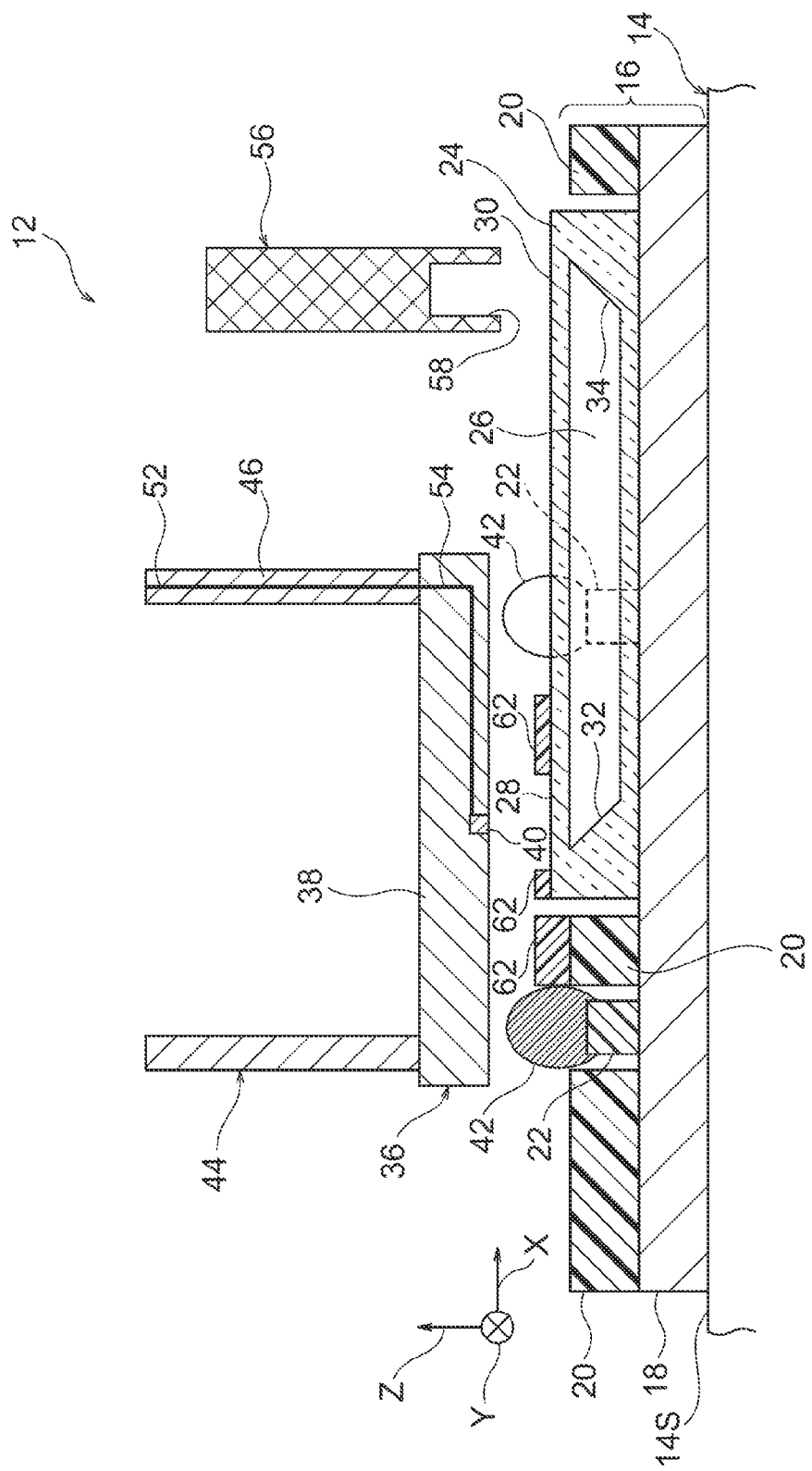

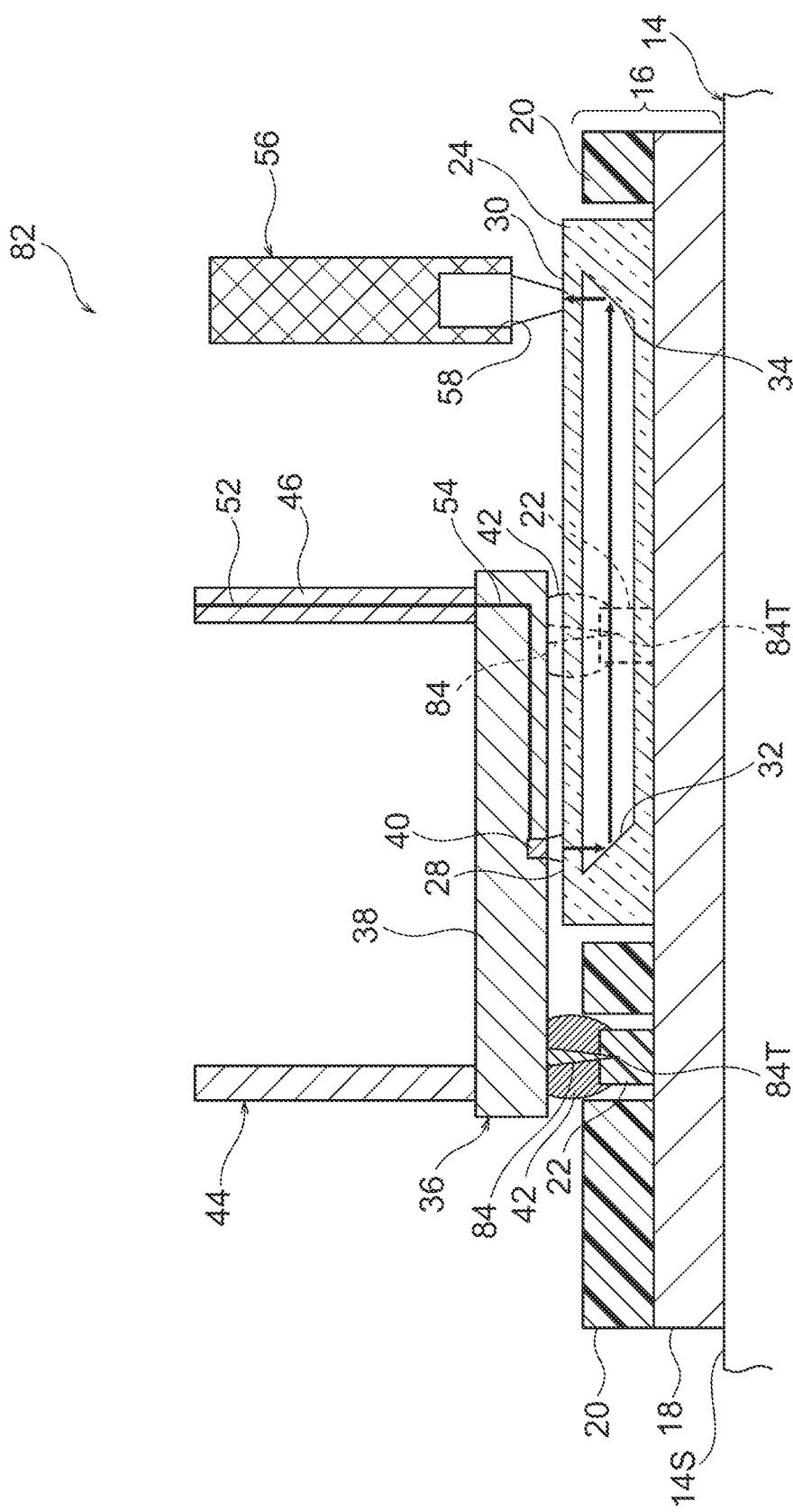

LIGHT EMITTING MEMBER MOUNTING METHOD AND APPARATUS

CROSS-REFERENCE TO RELATED APPLICATION

This application is based upon and claims the benefit of priority of the prior Japanese Patent Application No. 2012-071794, filed on Mar. 27, 2012, the entire contents of which are incorporated herein by reference.

FIELD

The embodiments discussed herein are related to a light emitting member mounting method and apparatus.

BACKGROUND

When mounting a light emitting member equipped with a light emitting component to a substrate mounted with an optical waveguide member configuring an optical waveguide, a high precision of positional alignment is desired for the light emitting member with respect to the substrate. For example, as a method for performing alignment with respect to a substrate, a method is known in which a sub-mount mounted with a light emitting element is held in a clamp, and the light emitting element of the sub-mount is operated.

RELATED PATENT DOCUMENTS

Japanese Laid-Open Patent Publication No. 2005-285889

SUMMARY

According to an aspect of the embodiments, a light emitting member mounting method is provided. The light emitting member mounting method includes: (a) causing a friction material to contact a substrate including at least an optical waveguide member mounted on a base and to contact a light emitting member that is to be mounted to the substrate and that includes a light emitting component, so as to suppress relative movement between the substrate and the light emitting member using frictional force exerted on the substrate and the light emitting member, and positionally aligning the light emitting member to the substrate by employing light emitted from the light emitting component; and (b) bonding the substrate and the light emitting member together by melting a bonding material interposed between the substrate and the light emitting member.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a schematic cross-section illustrating a light emitting member mounting method of a first exemplary embodiment.

FIG. 5 is a schematic cross-section illustrating a light emitting member mounting method of a second exemplary embodiment.

DESCRIPTION OF EMBODIMENTS

Detailed explanation follows regarding a light emitting member mounting method (abbreviated below to "mounting method") and light emitting member mounting apparatus (abbreviated below to "mounting apparatus") disclosed in the present application, with reference to the drawings.

Figure 3:
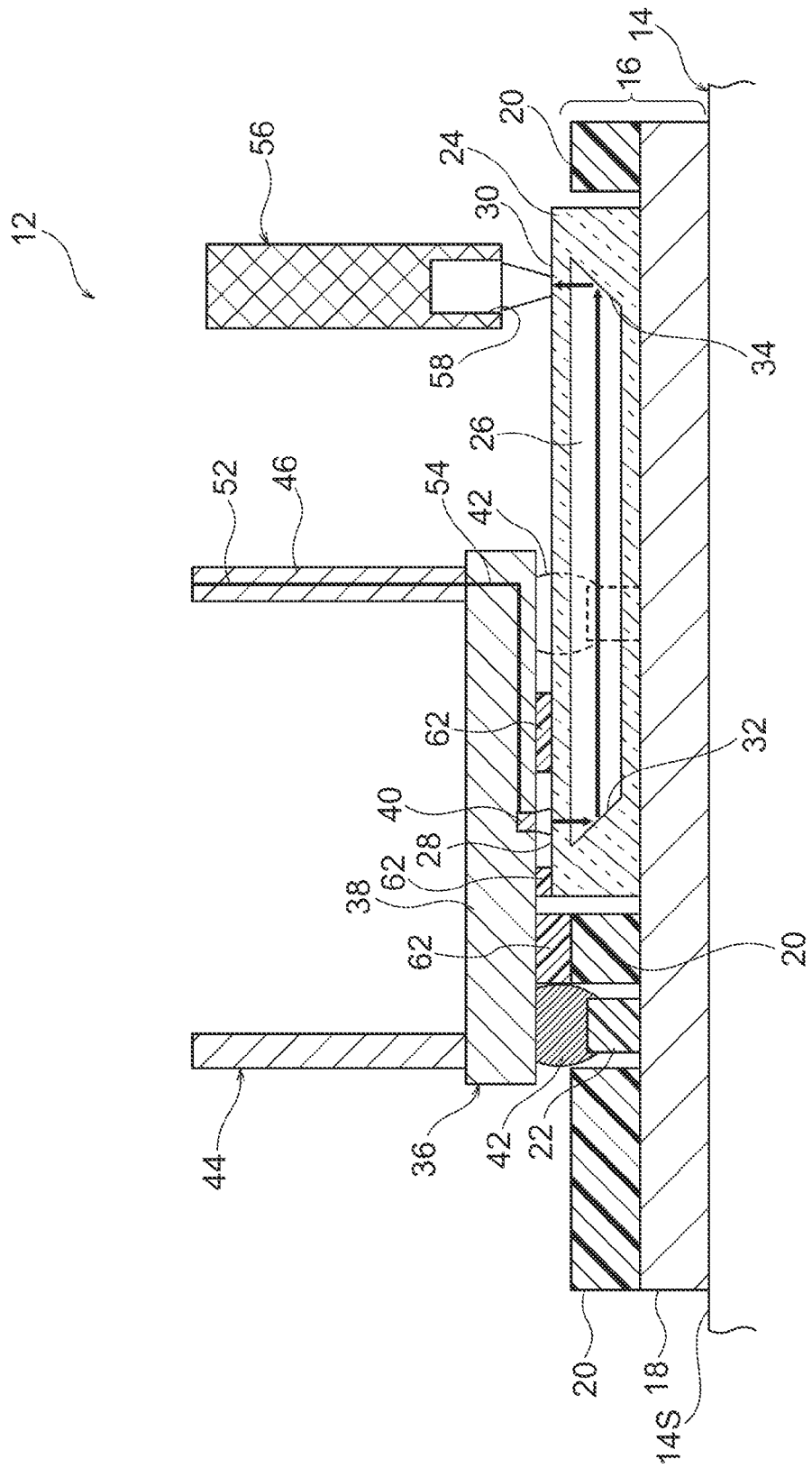
FIG. 3 is a schematic cross-section illustrating a light emitting member mounting method of the first exemplary embodiment.

As illustrated in FIG. 1 and FIG. 3, a mounting apparatus 12 of the present exemplary embodiment includes a support stage 14 equipped with a support face 14S that supports a substrate 16. The support stage 14 is an example of a support member.

The substrate 16 includes a base 18 formed in a flat plate shape from a material having specific electrical insulation ability and rigidity (for example from an epoxy resin). At least one face of the base 18 is formed with a specific circuit pattern using a material such as copper foil. The circuit pattern is covered with a covering material such as a solder resist as the need arises.

Footprints 22 are also provided to the base 18. In a process for mounting a light emitting member 36 to the substrate 16, as described later, solder 42 is coated on the footprints 22, and the solder 42 is employed to bond the light emitting member 36 to the substrate 16.

An optical waveguide member 24 is installed to the base 18. The optical waveguide member 24 is formed overall in a plate or sheet shape. One face of the optical waveguide member 24 makes contact with the base 18 and is fixed thereto such as by bonding.

A light inlet port 28 and a light outlet port 30 are provided on the opposite face of the optical waveguide member 24 to the face of the optical waveguide member 24 in contact with the base 18. The optical waveguide member 24 has an internal core provided with two reflection mirrors 32, 34. An optical waveguide 26 is thus configured between the light inlet port 28 and the light outlet port 30. In the optical waveguide 26, light that is incident from the light inlet port 28 is reflected in sequence at right angles by the reflection mirrors 32, 34 and then emerges as emitted light from the light outlet port 30.

Figure 2A:
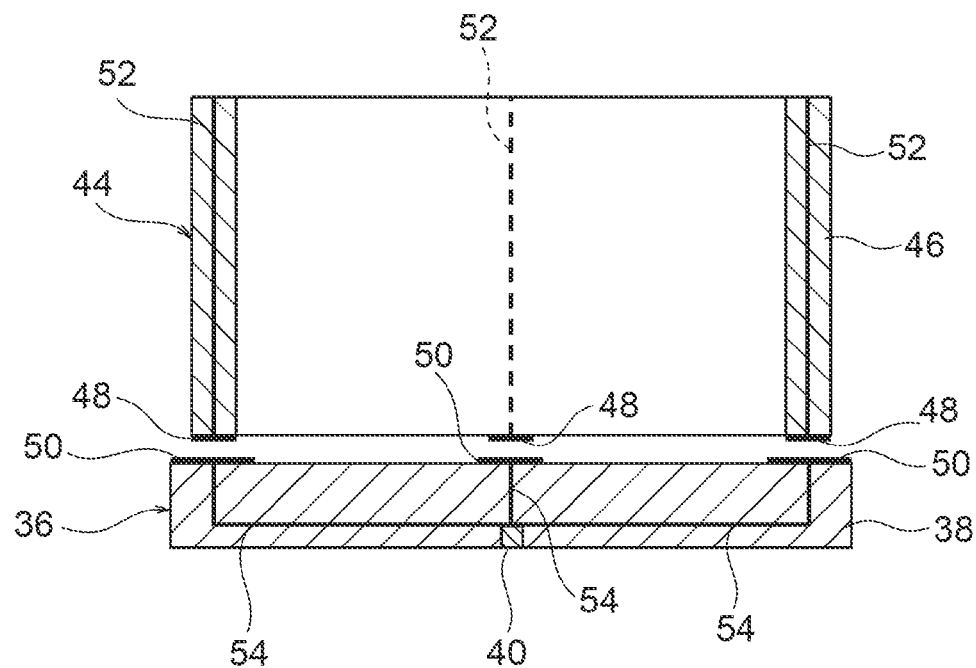
FIG. 2A is cross-section illustrating a suction nozzle and a light emitting member in a light emitting member mounting method of the first exemplary embodiment.
Figure 2B:
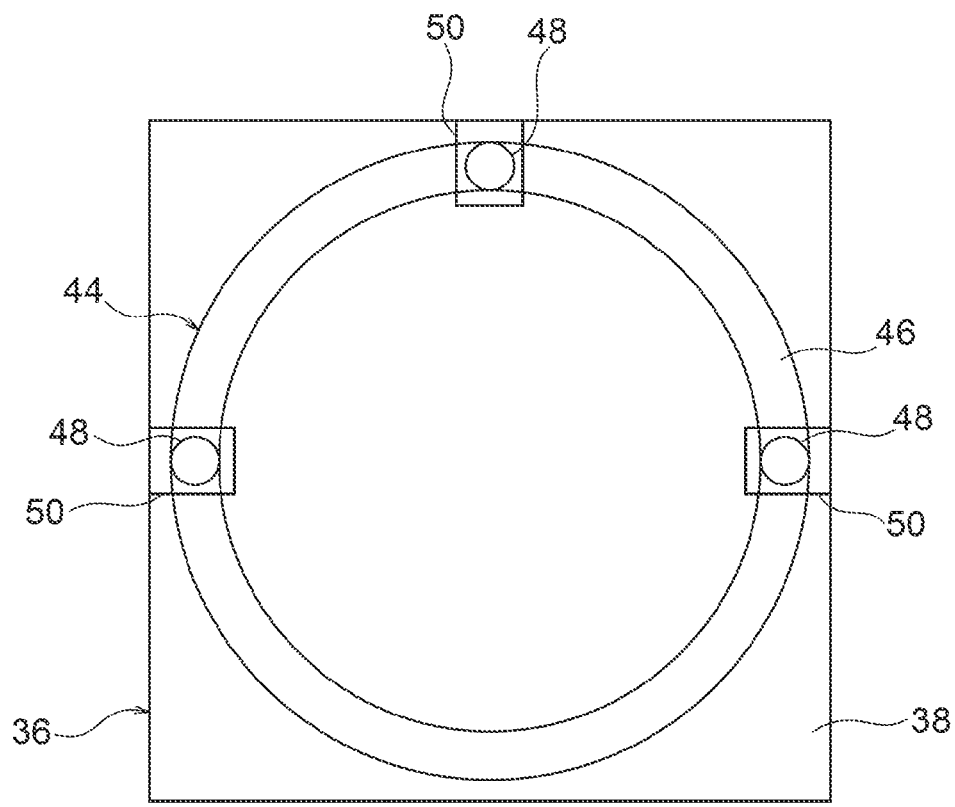
FIG. 2B is plan view illustrating a suction nozzle and a light emitting member in a light emitting member mounting method of the first exemplary embodiment.

The light emitting member 36 is mounted to the substrate 16. In the present exemplary embodiment, as illustrated in FIG. 2A and FIG. 2B, the light emitting member 36 includes a base 38. The base 38 is formed in a flat plate shape from a material (for example an epoxy resin) having specific electrical insulation ability and rigidity (shape stability).

A light emitting component 40 that emits light is attached to the base 38. Then, as illustrated in FIG. 3, the light emitting member 36 is bonded by the solder 42 to the substrate 16 such that light of the light emitting component 40 is incident through the light inlet port 28 to the optical waveguide member 24.

Note that in FIG. 1 to FIG. 3 only one light emitting component 40 is illustrated for a single base 38, however there is no limitation to the number of the light emitting components 40 for a single base 38. In the example of the present exemplary embodiment, 12 individual light emitting members 36 are attached to the base 38 so as to form a row (however configuration may also be made with two or more rows or with a matrix pattern).

The mounting apparatus 12 has a suction nozzle 44. The suction nozzle 44 has a nozzle body 46 capable of suction-adhering the base 38 of the light emitting member 36 from the face on the opposite side of the base 38 to the side on which the light emitting member 36 is attached. In the present exemplary embodiment the nozzle body 46 is formed in a substantially circular cylinder shape, configured to enable suction generation at the inside of the nozzle body 46 by a suction apparatus. The suction nozzle 44 is an example of a holding member.

The nozzle body 46 is capable of being moved in a direction to approach or separate from the support face 14S and being moved along the support face 14S using a drive mechanism.

The nozzle body 46 is capable of being moved by the drive mechanism along the support face 14S of the support stage 14 capable of being rotated about a rotation center of a line normal to the support face 14S (normal to the X-Y plane) (for convenience this rotation direction is referred to below as "θ direction"). For convenience, in FIG. 1 a transverse direction along the support face 14S is denoted the X direction, a direction along the support face 14S perpendicular to the X direction is denoted the Y direction, and a normal direction to the X-Y plane is denoted by the arrow Z direction. Hence, when the light emitting member 36 has been suctioned by the suction nozzle 44, the light emitting member 36 can be brought near to the substrate 16 and disposed at a specific position while positioning with respect to the substrate 16 with an appropriate combination of movement along the X-Y plane and the above rotation.

The face of the nozzle body 46 of the suction nozzle 44 facing towards the base 38 has been treated with electroplating (such as metal electroplating) to give electrical continuity with the light emitting member 36, and plural (three in the example illustrated in FIG. 2B: plus, minus, standby) electrodes 48 are provided. The electroplating preferably achieves a sufficient thickness from the perspective of suppressing abrasion.

In the base 38 of the light emitting member 36, the opposite face of the base 38 to the face provided with the light emitting component 40 is also treated with similar processing (such as electroplating) to that at the leading end portion of the nozzle body 46, thereby providing plural electrodes 50 corresponding to the electrodes 48. Power from a power source is capable of being supplied to the light emitting component 40 from wiring lines 52 in the nozzle body 46 through the electrodes 48, 50 and wiring lines 54. The wiring lines 52, the electrodes 48, 50 and the wiring lines 54 are examples of power supply members.

Note that in the example illustrated in the drawings the wiring lines 52 are a type embedded internally to the nozzle body 46. Various constructions may be employed as alternatives thereto, such as a type in which copper film is adhered or vacuum deposited on the outer peripheral face or the inner peripheral face of the nozzle body 46, or a type in which copper film is embedded inside the nozzle body 46.

The contact resistance between the nozzle body 46 and the light emitting member 36 may be adjusted by for example performing roughening treatment (for example scrubbing) to the leading end of the nozzle body 46.

The shape of the nozzle body 46 is not limited to the circular cylindrical shape mentioned above. However, preferably the nozzle body 46 makes contact with the light emitting member 36 over a wide area from the standpoint of pressing the light emitting member 36 evenly against the substrate 16 and maintaining the light emitting member 36 in a parallel state with respect to the substrate 16. In addition, from the perspective of suppressing unintentional tilting of the light emitting member 36 when being pressed towards the substrate 16, the shape of the nozzle body 46 is preferably symmetrically shaped about a given axis when viewed along the pressing direction (the opposite direction to the arrow Z direction).

Configuring the contact portion of the nozzle body 46 with the light emitting member 36 a ring shape satisfies such conditions and is so preferable. The circular cylindrical shape mentioned above has a ring shaped contact portion with the light emitting member 36, and facilitates simple molding for the shape of the nozzle body 46. As another example, in a nozzle body of circular conical shape the contact portion with the light emitting member 36 is also ring shaped.

The suction nozzle 44 (in particular the nozzle body 46) is preferably not resilient or soft, and preferably has a level of rigidity to warrant treatment as a rigid body in practice so as to enable tilting of the suctioned light emitting member 36 to be suppressed.

Identification marks are provided on the optical waveguide member 24. Rough positional alignment (such positional alignment is called "passive alignment" below) of the light emitting member 36 with respect to the substrate 16 can accordingly be achieved while reading the identification marks with a reader.

Note that it is possible to employ identification marks formed such as by copper etching on the base 18 as identification marks employed in passive alignment. However, "positional alignment" of the light emitting member 36 with respect to the substrate 16 is intrinsically performed from the perspective of aligning the position of the light emitting component 40 with respect to the optical waveguide 26 (the light inlet port 28). Therefore, when identification marks on the base 18 are employed with low mounting position precision of the optical waveguide member 24 with respect to the base 18 then a large positional misalignment of the light emitting component 40 with respect to the optical waveguide 26 arises. However in contrast thereto, when identification marks of the optical waveguide member 24 provided on the base 38 are employed, then there is no influence from the mounting position precision of the optical waveguide member 24 with respect to the base 18 on positional alignment of the light emitting component 40 with respect to the optical waveguide 26. Moreover, it is possible to form identification marks on the optical waveguide member 24 with respect to the base 38 with high precision by such methods as laser processing. From this standpoint it is accordingly preferable to employ identification marks formed to the optical waveguide member 24 as the identification marks employed during passive alignment.

The mounting apparatus 12 includes a light intensity sensor 56. The light intensity sensor 56 includes a light receiving section 58 and is able to detect the light intensity (amount of light) emitted from the light outlet port 30 of the optical waveguide member 24. After the above passive alignment has been performed, light of the light emitting component 40 is then made incident to the optical waveguide 26 through the light inlet port 28, and the position of the light emitting member 36 is adjusted while detecting the light intensity of light emerging from the light outlet port 30 using the light intensity sensor 56. It is accordingly possible to perform positional alignment (this positional alignment is called "active alignment" below) with higher precision than in the above passive alignment.

As the light intensity sensor 56, it is possible to employ sensor(s) constructed with a light pick-up element such as a photodiode or a near-field pattern measuring device capable of detecting light intensity distributions. In either case, the light receiving section 58 of the light intensity sensor 56 is provided with sufficient light receiving surface area to enable light to be received from the light outlet port 30 without leakage even when there is misalignment to the light emitting component 40 during positional alignment.

Figure 4:
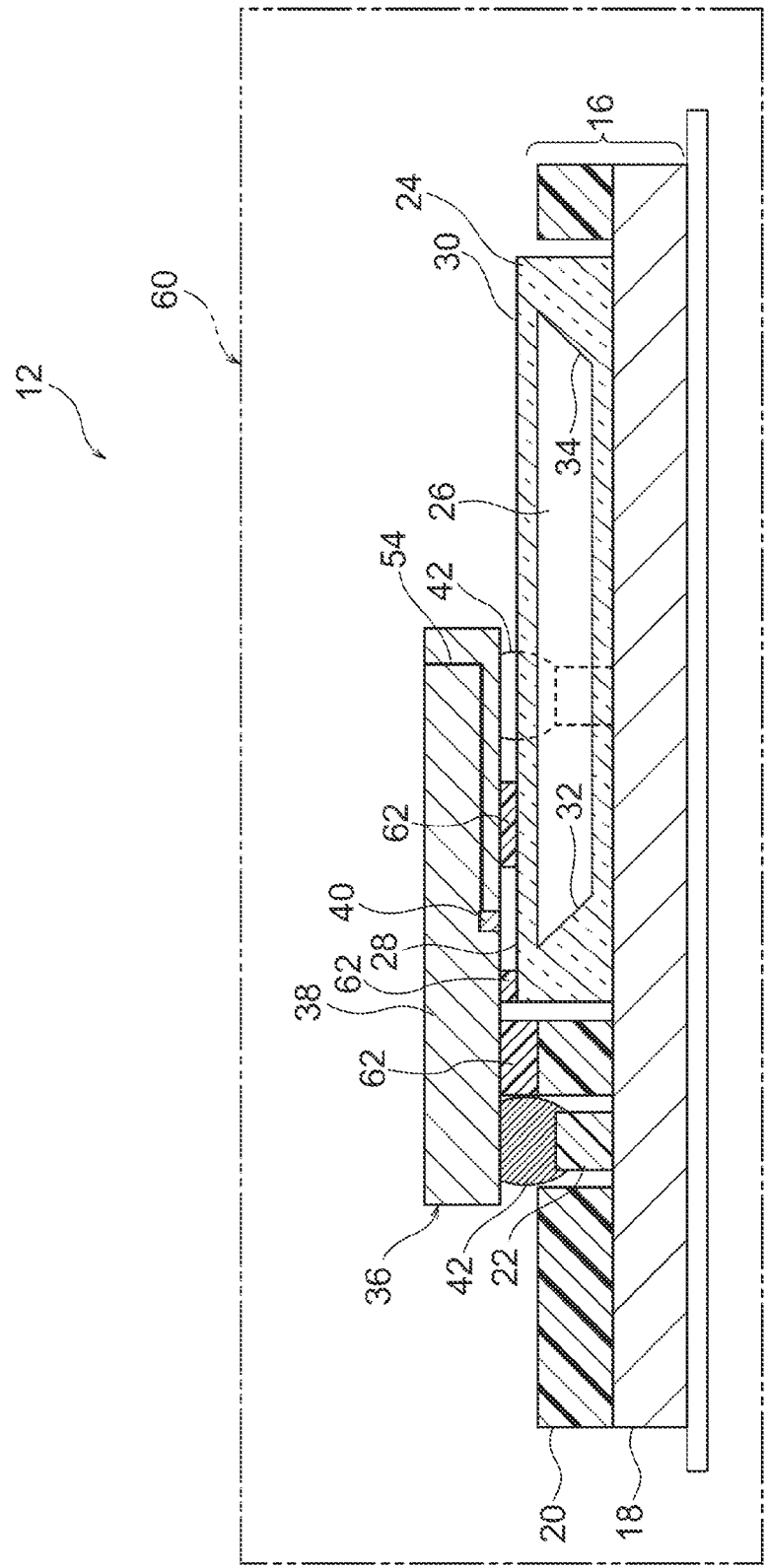
FIG. 4 is a schematic cross-section illustrating a reflow device accompanying a light emitting member mounting method of the first exemplary embodiment.

The mounting apparatus 12 of the present exemplary embodiment has a reflow device 60, as illustrated in FIG. 4. The substrate 16 and the light emitting member 36 that has been positionally aligned (by active alignment) to the substrate 16 is placed at a specific position inside the reflow device 60 (with the suction due to the suction nozzle 44 and the light intensity detection by the light intensity sensor 56 removed). The solder 42 can then be melted by generating a specific environment (under conditions of sufficiently high temperature to melt the solder 42). The light emitting component 40 can then be bonded (mounted) to the substrate 16 by the solder 42 hardening on subsequent cooling. The reflow device 60 is an example of a bonding device.

In the present exemplary embodiment, as can be seen from FIG. 3, when the light emitting member 36 is being bonded to the substrate 16, friction sheet(s) 62 are disposed between the light emitting member 36, and solder resist 20 of the substrate 16 and the optical waveguide member 24. The friction sheets 62 are, for example, formed as a sheet shape of epoxy resin in a semi-cured state. Reference here to "semi-cured" means a state in which the epoxy resin is not completely hard and a certain degree of fluidity is exhibited in response to external force when external force is applied, however under normal temperature and humidity a certain degree of shape stability is exhibited such that unintentional deformation does not take place for example under gravity.

The friction sheets 62 may be attached by adhering to the solder resist 20 and the optical waveguide member 24 at the prior stage when passive alignment is performed on the light emitting member 36 with respect to the substrate 16, as illustrated in FIG. 1. Moreover, the friction sheets 62 may be simply placed on the solder resist 20 and on the optical waveguide member 24. Alternatively the friction sheets 62 may be attached for example by adhesive to the light emitting member 36. The friction sheets 62 are an example of a friction material acting as a relative movement suppressing member.

When active alignment of the light emitting member 36 with respect to the substrate 16 is being performed, and after active alignment has been performed, the friction sheets 62 are in contact both with the solder resist 20 and the optical waveguide member 24, and with the light emitting member 36. The friction sheets 62 exhibit frictional force both on the solder resist 20 and the optical waveguide member 24, and on the light emitting member 36. A shift in position of the substrate 16 with respect to the light emitting member 36 is accordingly suppressed even in a state in which the light emitting member 36 is no longer suctioned (held) by the suction nozzle 44. However, the frictional force is at a level so as not to affect positional alignment of the light emitting member 36 with respect to the substrate 16.

In particular in the first exemplary embodiment, the friction sheets 62 are formed in a sheet shape and accordingly make surface contact with both sides, with the solder resist 20 and the optical waveguide member 24, and with the light emitting member 36. The friction sheets 62 also suppress movement (tilting) of the light emitting member 36 so as to become orientated in a non-parallel state to the substrate 16 (tilting the optical axis of the light from the light emitting component 40).

Explanation follows regarding a method (mounting method) employing the mounting apparatus 12 of the present exemplary embodiment for positional alignment and bonding of the light emitting member 36 to the substrate 16.

As illustrated in FIG. 1, on the base 18 a specific circuit pattern is covered by the solder resist 20, and the solder 42 is coated on the footprints 22. The optical waveguide member 24 is also attached at a specific position. In particular, in the present exemplary embodiment the friction sheets 62 are adhered to specific positions of the solder resist 20 and on the optical waveguide member 24.

Passive alignment of the light emitting member 36 with respect to the substrate 16 is first performed. More specifically, the light emitting member 36 is suctioned using the suction nozzle 44 and rough positional alignment is performed of the light emitting member 36 with respect to the substrate 16 (the optical waveguide member 24) using the identification marks on the optical waveguide member 24.

Note that at the stage passive alignment is performed the electrodes 48, 50 are in contact with each other, however there is no need to cause light to be emitted from the light emitting component 40 and light intensity is not detected by the light intensity sensor 56.

Active alignment of the light emitting member 36 is then performed. Specifically, as illustrated in FIG. 3, the light emitting member 36 is suctioned with the suction nozzle 44. Then power is supplied to the light emitting component 40 from a power source through the wiring lines 52 inside the nozzle body 46, the electrodes 48, 50, and the wiring lines 54. Light is accordingly emitted from the light emitting component 40. This light from the light inlet port 28 is incident to the light intensity sensor 56 through the light outlet port 30. When there is misalignment of the position of the light emitting component 40 with respect to the optical waveguide member 24 (the light inlet port 28) then even if a certain light intensity is detected with the light intensity sensor 56 the light intensity does not reach a normal level. Consequently, the position of the light emitting member 36 is adjusted in the X-Y plane in the X direction, the Y direction and the θ direction such that the light intensity detected by the light intensity sensor 56 reaches a maximum.

Note that since the linear expansion coefficients of the light emitting member 36 and the optical waveguide member 24 are different from each other, a different amount of expansion between the light emitting member 36 and the optical waveguide member 24 is expected during heating. In order to suppress a slight shift in position between the light emitting member 36 and the optical waveguide member 24 arising from this expansion amount difference, the above positional alignment, and in particular the active alignment, is preferably performed at the operating temperature of the mounting apparatus 12.

After active alignment has been performed, suction (holding) of the light emitting member 36 by the suction nozzle 44 is released. There is no longer a need to perform light intensity detection with the light intensity sensor 56. Then, as illustrated in FIG. 4, reflow is performed at a specific position inside the reflow device 60 to fix the substrate 16 and the light emitting member 36. The solder 42 is melted by the reflow process.

When the solder 42 accordingly melts and becomes a liquid body, the surface tension of the surface of the liquid body starts to act. The surface tension acts as a force attempting to relatively move the light emitting member 36 with respect to the substrate 16 in a transverse direction (including in a direction along the X-Y plane and rotation in the θ direction). In the present exemplary embodiment, the substrate 16 (the solder resist 20 and the optical waveguide member 24) and the light emitting member 36 are in contact with the friction sheets 62. Consequently, even though the light emitting member 36 might attempt relative movement in the X direction, the Y direction or the θ direction, such relative movement is suppressed by frictional force from the friction sheets 62. Namely, the light emitting component 40 can be maintained in a state of high precision positional alignment with respect to the optical waveguide member 24 and the light inlet port 28, and the light emitting component 40 bonded (mounted) to the substrate 16.

Consider the conditions for suppressing relative movement of the light emitting member 36 with respect to the substrate 16 using the friction sheets 62. This may be achieved by satisfying the relationship:

$$T > F \quad (1)$$

wherein T is the maximum frictional force (static frictional force) between the friction sheets 62 and the light emitting member 36, and F is the force attempting to move the light emitting member 36 in a horizontal direction arising due to the surface tension of the solder 42 (bonding material).

The static frictional force T is given by:

$$T = \mu N \quad (2)$$

wherein μ is the coefficient of static friction between the friction sheets 62 and the light emitting member 36, and N is the normal force acting from the friction sheets 62 on the light emitting member 36. The force F is proportional to the surface tension S and the volume V of the solder 42, and so, by employing a proportionality coefficient k:

$$F = kSV \quad (3)$$

Substituting Equation (2) and Equation (3) in Equation (1) results in:

$$\mu N > kSV \quad (4)$$

Meanwhile, from the perspective of suppressing relative movement of the light emitting member 36 with respect to the substrate 16, as understood from Equation (4), methods might be considered of, for example, employing a solder 42 (bonding material) with lower surface tension or reducing the volume of the solder 42 (bonding material). However, in such methods it would be expected to be difficult to maintain specific bonding force and bonding life of the solder 42. However, by employing the friction sheets 62, relative movement of the light emitting member 36 with respect to the substrate 16 can be suppressed by utilizing the friction sheets 62 without reducing the volume of the solder 42 or employing a material with weaker surface tension. Note that weights may be placed on the light emitting member 36 in order to enhance the relative movement suppression effect described above.

Moreover, in the present exemplary embodiment, the sheet shaped friction sheets 62 make surface contact with both sides, with the solder resist 20 and the optical waveguide member 24, and with the light emitting member 36. The light emitting member 36 can accordingly be maintained in a parallel state with respect to the substrate 16, and the optical axis of light from the light emitting component 40 can be suppressed from tilting.

There is no limitation to the optical waveguide member 24 and the solder resist 20 as the members in contact with the friction sheets 62 on the substrate 16 side and other members may be employed therefor. However, preferably the friction sheets 62 make contact with the optical waveguide member 24 in order to efficiently suppress a shift in position between the optical waveguide member 24 and the light emitting member 36. In contrast, in a configuration with the friction sheets 62 in contact with the solder resist 20, since the solder resist 20 is provided over a wide range of the base 18, there is a high degree of freedom for the placement and shape of the friction sheets 62.

Note that in practice there are plural of the light emitting components 40 attached to a single light emitting member 36, and there are also plural corresponding optical waveguides 26 provided. In consideration thereof, the light intensity is preferably detected by the light intensity sensor 56 detecting the light intensity from plural (but not necessarily all) of the light emitting components 40 when active alignment is being performed. For example, as in the present exemplary embodiment, in a configuration wherein a single of the light emitting members 36 is provided with 12 individual light emitting components 40 in a single row, positional alignment may be performed to obtain the maximum light intensity for the light from the two ends of the row (the $1^{st}$ and $12^{th}$) of the light emitting components 40. Configuration may also be made to additionally employ one or more than one of the light emitting components 40 from an intermediate portion of the row. In such cases the position of the light emitting member 36 may be determined by employing the maximum light intensity point for each of the respective detections, then achieving the maximum overall light intensity for the light from the plural light emitting components 40 by employing a statistical method, such as a least squares method. Obviously all of the light from the light emitting member 36 may be employed, with positional alignment performed for all the light emitting components 40.

In the first exemplary embodiment, the friction sheets 62 preferably have a specific hardness in order to suppress the solder 42 from collapsing. However, when the friction sheets 62 are too hard then there is concern regarding shock acting on the bottom face of the light emitting member 36 during positional alignment of the light emitting member 36. Consequently, the friction sheets 62 preferably have a level of softness capable of alleviating such shock. Obviously the movement of the suction nozzle 44 is controlled according to the hardness coefficient of the friction sheets 62 when performing positional alignment of the light emitting member 36 to the substrate 16, and adjustment may be performed so as to make the shock referred to above a small amount.

The friction material is also not limited to the friction sheets 62 of the first exemplary embodiment. Namely there is no requirement for the friction material to be formed in a sheet shape, and a rod shaped or a block shaped friction material may be employed. However, the portion(s) where the friction sheet(s) 62 contact the member(s) on the substrate 16 side and contact the light emitting member 36 are preferably contact portion(s) that spread out to an extent to make surface contact or so as to be viewed as surface contact in practice. Frictional force can be efficiently exhibited when there is surface contact, and an effect to suppress the light emitting member 36 from tilting with respect to the substrate 16 (and in particular the optical axis of light from the light emitting component 40 from tilting) can be enhanced.

FIG. 5 illustrates part of a mounting apparatus 82 of a second exemplary embodiment. In the second exemplary embodiment the same reference numerals are allocated to similar configuration elements and members to those of the first exemplary embodiment, and further detailed explanation thereof is omitted.

The mounting apparatus 82 of the second exemplary embodiment does not employ the friction sheets 62 according to the first exemplary embodiment (see FIG. 1 and FIG. 3), and instead pins 84 are provided. The pins 84 are formed with sharply pointed leading end portions 84T of substantially circular cone shape (or angular cone shape). The pins 84 are an example of an engaging member serving as a relative movement suppressing member.

The pins 84 are fixed to a light emitting member 36 such that the leading end portions 84T face towards footprints 22 (towards the bottom in FIG. 5) when the light emitting member 36 is in a mounted state to a substrate 16. The position of the pins 84 is positioned such that the leading end portions 84T pierce through the solder 42 and then stick into the footprints 22. Note that although configuration may be made with a single of the pins 84, an effect to suppress the light emitting member 36 from rotating in the θ direction with respect to the substrate 16 is enhanced when two or more of the pins 84 are provided.

Although a single of the pins 84 may be provided for a single light emitting member 36, plural are provided in the example illustrated. By thus providing plural of the pins 84, the effect to suppress relative tilting of the light emitting member 36 with respect to the substrate 16, and to suppress tilting of the optical axis of light from the light emitting component 40, is enhanced.

In the mounting method of the second exemplary embodiment, similarly to in the first exemplary embodiment, passive alignment of the light emitting member 36 with respect to the substrate 16 is performed. Active alignment is also performed by using a light intensity sensor 56 to detect light from the light emitting member 36 that passes through an optical waveguide 26.

Accordingly, the leading end portions 84T of the pins 84 are stuck into and coupled to the footprints 22 in the state in which positional alignment of the light emitting member 36 is performed with respect to the substrate 16. Relative movement of the light emitting member 36 with respect to the substrate 16 is accordingly suppressed. Consequently, when reflow is performed using the reflow device 60, relative movement between the light emitting member 36 and the substrate 16 (in the X direction, the Y direction and the θ direction) is suppressed even when solder 42 melts. Namely, in the second exemplary embodiment the light emitting component 40 can also be maintained in a state of high precision positional alignment with respect to the light inlet port 28 of the optical waveguide member 24, and the light emitting component 40 bonded (mounted) to the substrate 16.

In particular, in the second exemplary embodiment, the leading end portions 84T of the pins 84 are stuck into the footprints 22, and so resistance acts against tilting of the light emitting member 36 to place the light emitting member 36 in a non-parallel state with respect to the substrate 16. However there are plural of the pins 84 provided. The light emitting member 36 can thereby be maintained in a parallel state with respect to the substrate 16, and the optical axis of the light from the light emitting component 40 can be suppressed from tilting.

The object into which the leading end portions 84T of the pins 84 are stuck is not limited to the footprints 22. For example, the leading end portions 84T may stick into the footprints 22 and/or into the optical waveguide member 24. However, the object into which the leading end portions 84T are stuck is preferably the footprints 22 since the footprints 22 are provided coated with the solder 42, and so there is little effect on the structure or the physical properties of the substrate 16 even when the leading end portions 84T of the pins 84 are stuck in.

In the second exemplary embodiment, the leading end portions 84T of the pins 84 have a sharp shape (a pointed shape), with a structure readily capable of being stuck into the footprints 22, however the pins 84 may, for example, be circular column shaped. With circular column shaped pins 84 it is more difficult to stick the pins 84 into objects such as the footprints 22, however a shift in position of the light emitting member 36 with respect to the substrate 16 can be suppressed by a portion of the outer peripheral face of a pin 84 making contact with a side face of a member on the base 18. In such cases a shift in position of the light emitting member 36 in plural directions may be suppressed by a structure in which plural of the pins 84 are provided with each of the pins 84 making contact with a member on the base 18 in a different direction.

In the second exemplary embodiment, the pins 84 may be fixed to the substrate 16 side (for example to the base 18, the solder resist 20, the footprints 22 and/or the optical waveguide member 24). In such cases, leading end portions 84T may be configured to stick into the light emitting member 36 (however only to an extent that does not affect the emission of light from the light emitting component 40). When the pins 84 are configured as circular column shapes, a portion of the outer peripheral face of the pins 84 may be engaged by contact with the side face of the light emitting member 36.

As understood from the above explanation, in any of the exemplary embodiments mounting can be achieved with a shift in position of the light emitting member 36 with respect to the substrate 16 suppressed when the solder 42 (bonding material) is in a molten state.

In each of the above exemplary embodiments mounting of the light emitting member 36 is to the substrate 16, however there is no limitation thereto. For example, other examples include a printed wiring board of a super computer, a server system or a network device (in particular a medium to large sized device).

In such printed wiring boards the core of the optical waveguide 26, namely the size of the light inlet port 28, is small. The length of one side of the light inlet port 28 is for example about 30 to 50 μm. A positioning precision of the light emitting component 40 with respect to the light inlet port 28 in the range of 3 to 5 μm is accordingly desired. Moreover, there is also a desire to suppress tilting of the optical axis of light from the light emitting component 40 with respect to the light inlet port 28. The technology of each of the above exemplary embodiments may accordingly be favorably applied in cases demanding high positioning precision of the light emitting member 36 (the light emitting component 40) with respect to the substrate 16 (the light inlet port 28).

In particular, often technology (optical interconnect technology) is used to connect enabled for certain data transmission from the light emitting component 40 to the optical waveguide 26 in data transition at transmission rates of about 40 Gbps or greater. The core of the optical waveguide 26 is sometimes reduced to a smaller diameter in order to reduce transmission loss accompanying increasing speeds and distances of transmission. The technology of the above exemplary embodiments can be favorably applied to performing positional alignment of the light emitting member 36 (the light emitting component 40) to the optical waveguide member 24 in such cases of reduced core diameter.

In each of the above exemplary embodiments examples are given in which the solder 42 (bonding material) is melted by reflow to bond (mount) the light emitting member 36 to the substrate 16 (reflow methods). When bonding is accomplished by such reflow, a bonding material can be melted without the light emitting member 36 being held (or in a state in which a hold thereon has been released), enabling plural of the light emitting members 36 to be placed on a single substrate 16, and plural of the light emitting members 36 to be bonded to the substrate 16 by performing reflow a single time.

Obviously there is no limitation to such reflow methods as the mounting method. For example, it is possible to apply a method (bonder method) in which the light emitting member 36 is held even after performing positional alignment with respect to the substrate 16 and solder 42 is melted by heating with a heating device.

It is also possible to apply the technology of the above exemplary embodiments to a structure for mounting (flip-chip mounting) in which bumps are formed on the opposite face of the light emitting member 36 to that of the substrate 16 (or to the optical waveguide member 24) and mounting employs the bumps for electrical conduction. Flip-chip mounting, due to pressing and bonding the light emitting member 36 to the substrate 16 from the opposite side to the substrate 16 is highly effective at suppressing tilting of the light emitting member 36 with respect to the substrate 16.

An example of a configuration has been given above in which power to the light emitting member 36 is supplied through the suction nozzle 44. However, in a configuration in which the light emitting member 36 is equipped with a power source, it is possible to emit light from the light emitting component 40 using electrical supply from this light source. There are no need to use power supply by the suction nozzle 44 to the light emitting member 36 in such cases. In other words, in each of the above exemplary embodiments the suction nozzle 44 is configured so as to be capable of supplying power to the light emitting member 36, thereby enabling active alignment to be performed even when the light emitting member 36 does not itself include a power supply and enabling mounting to be performed while suppressing position shift with respect to the substrate 16.

There is no limitation to the suction nozzle 44 as the holding member that holds the light emitting member 36, and configuration may be made for example with a gripping structure that grips the light emitting member 36 as the holding member. However, employing the suction nozzle 44 enables the light emitting member 36 to be held by the face not provided with the light emitting component 40. The light emitting member 36 can accordingly be held without influencing the light emitted during active alignment.

The solder 42 has been given as an example of the bonding material employed in each of the exemplary embodiments above. Obviously however bonding materials such as adhesives other than solder 42 may be employed. However, the solder 42 acts both to bond the light emitting member 36 to the substrate 16 and also acts to provide electrical continuity. The number of components is accordingly reduced in comparison to configurations in which a bonding material separate to the solder 42 is used.

In the above an epoxy resin in a semi-cured state is employed as the friction material, however it is possible to employ for example cloth or non-woven fabric of resin fibers as the friction material. Employing an epoxy resin as the material is preferable from the perspectives of durability, electrical insulation properties and shape stability after the light emitting member 36 has been mounted to the substrate 16. Moreover an epoxy resin also exhibits an adhesive action after curing, and so the light emitting member 36 can be strongly fixed to the substrate 16.

Although embodiments of the technology disclosed herein have been explained above, the technology disclosed herein is not limited by the above, and it should be understood that it is possible to implement various modifications other than described above without departing from the spirit of the technology disclosed herein.

According to the light emitting member mounting method and mounting apparatus described in the present application, it is possible to mount a light emitting member while suppressing a shift in position with respect to a substrate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All cited documents, patent applications and technical standards mentioned in the present specification are incorporated by reference in the present specification to the same extent as if the individual cited documents, patent applications and technical standards were specifically and individually incorporated by reference in the present specification.

What is claimed is:

1. A light emitting member mounting method comprising:
causing a friction material to contact a substrate including at least an optical waveguide member mounted on a base and to contact a light emitting member that is to be mounted to the substrate and that includes a light emitting component, so as to suppress relative movement between the substrate and the light emitting member using frictional force exerted on the substrate and the light emitting member, and positionally aligning the light emitting member to the substrate by employing light emitted from the light emitting component; and
bonding the substrate and the light emitting member together by melting a bonding material interposed between the substrate and the light emitting member, wherein
a resin material in a semi-cured state is employed as the friction material.

2. A light emitting member mounting method comprising:
causing a friction material to contact a substrate including at least an optical waveguide member mounted on a base and to contact a light emitting member that is to be mounted to the substrate and that includes a light emitting component, so as to suppress relative movement between the substrate and the light emitting member using frictional force exerted on the substrate and the light emitting member, and positionally aligning the light emitting member to the substrate by employing light emitted from the light emitting component; and
bonding the substrate and the light emitting member together by melting a bonding material interposed between the substrate and the light emitting member, wherein
the friction material is also caused to contact the optical waveguide member.

3. A light emitting member mounting method comprising:
causing a friction material to contact a substrate including at least an optical waveguide member mounted on a base and to contact a light emitting member that is to be mounted to the substrate and that includes a light emitting component, so as to suppress relative movement between the substrate and the light emitting member using frictional force exerted on the substrate and the light emitting member, and positionally aligning the light emitting member to the substrate by employing light emitted from the light emitting component; and bonding the substrate and the light emitting member together by melting a bonding material interposed between the substrate and the light emitting member, wherein the substrate includes a solder resist, and the friction material is also caused to make contact with the solder resist.

* * * * *